Sept. 1, 1964     S. A. BERGMAN ETAL     3,146,477
COMBINATION VALVE AND CLEANING BALL LAUNCHER
Filed April 22, 1963     2 Sheets-Sheet 1
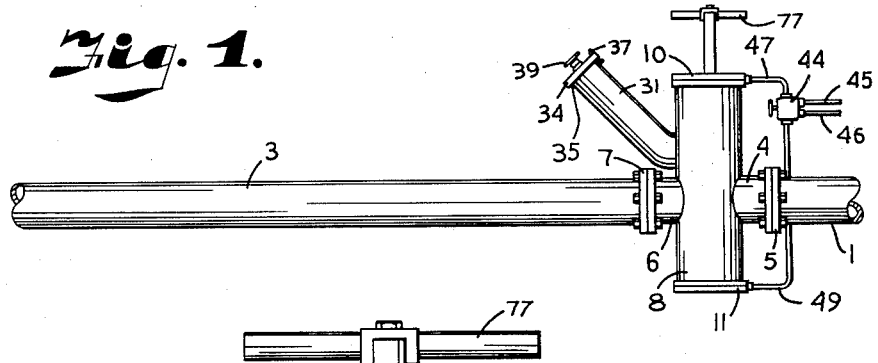
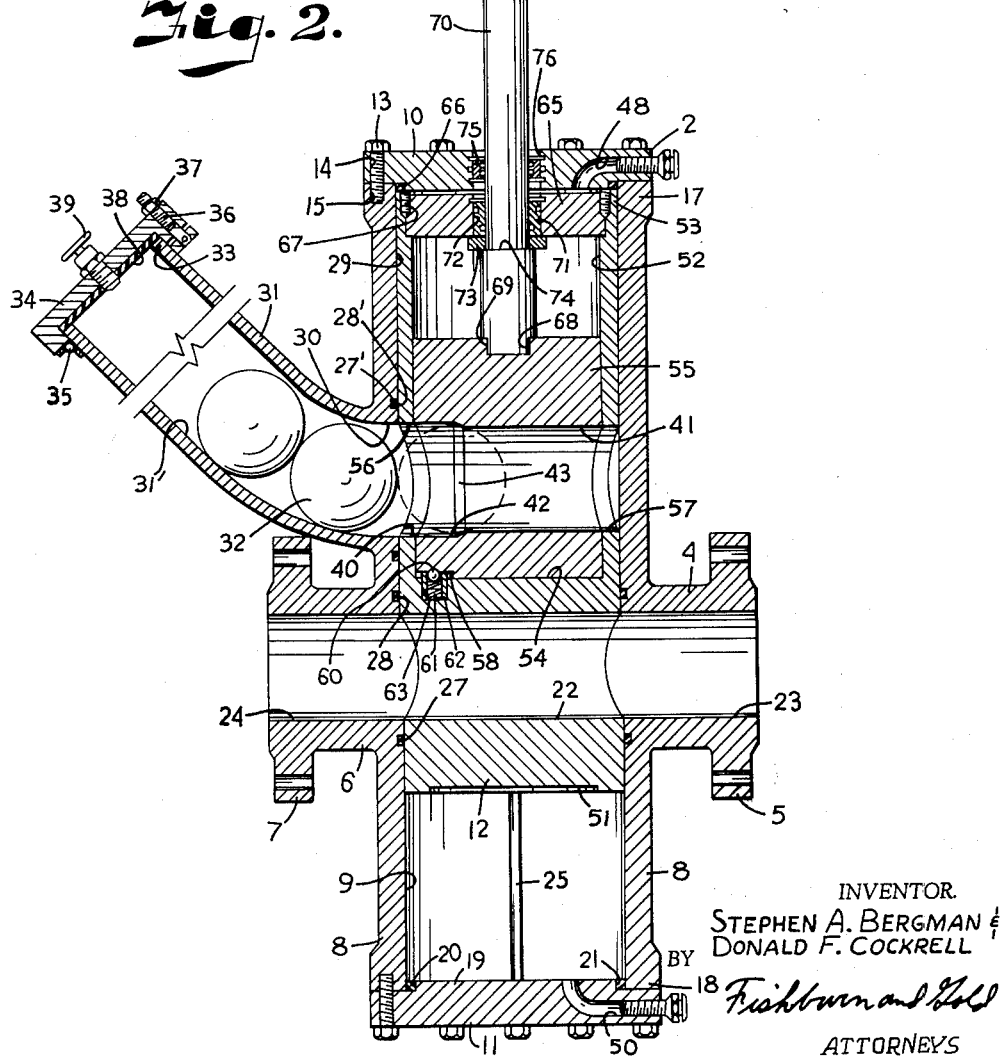
INVENTOR.
STEPHEN A. BERGMAN &
DONALD F. COCKRELL
BY
Fishburn and Gold
ATTORNEYS

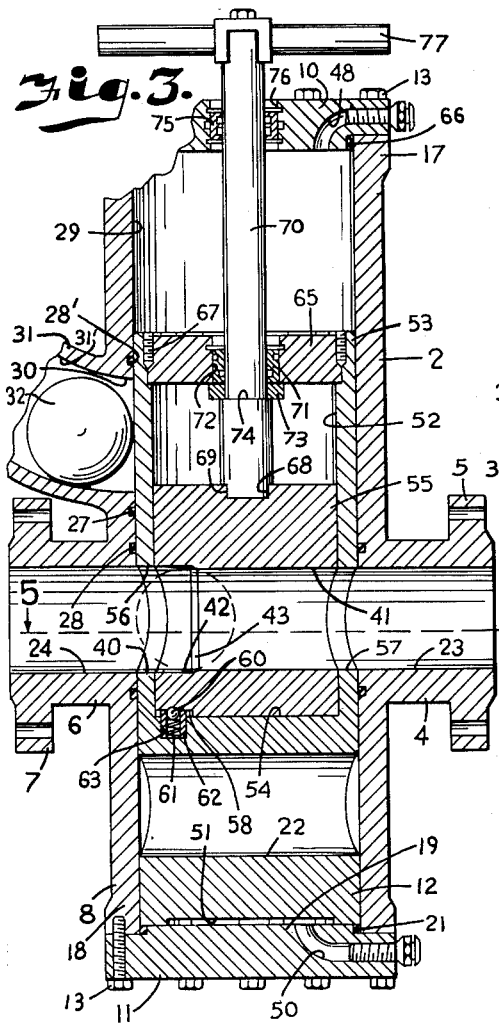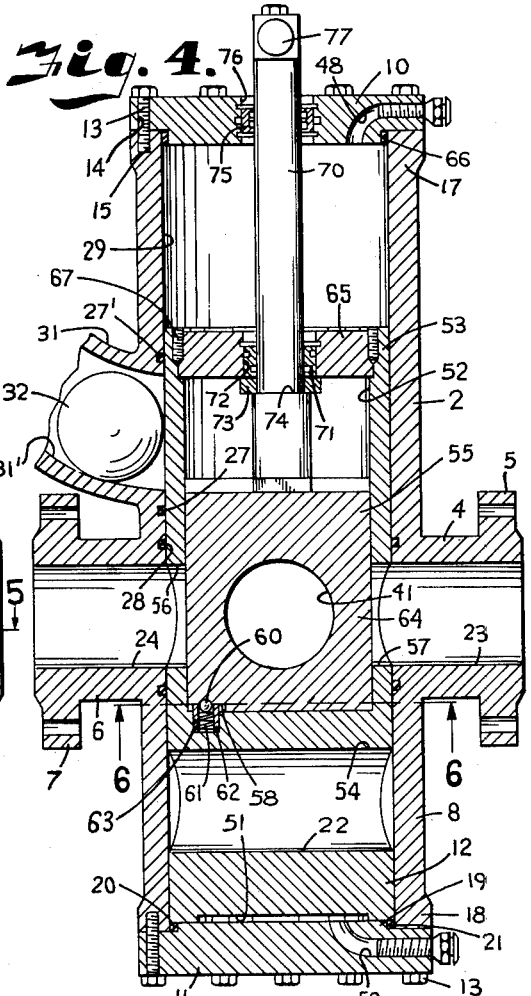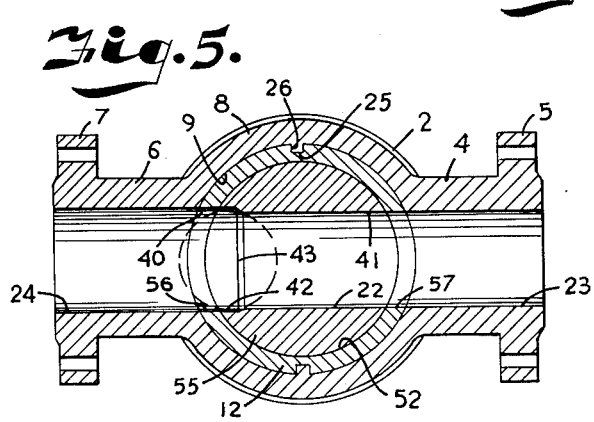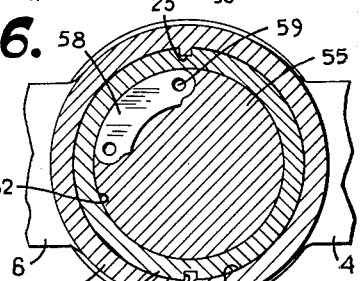
INVENTOR.
STEPHEN A. BERGMAN
DONALD F. COCKRELL
BY
Fishburn and Gold
ATTORNEYS

United States Patent Office 3,146,477
Patented Sept. 1, 1964

3,146,477
COMBINATION VALVE AND CLEANING
BALL LAUNCHER
Stephen A. Bergman, Prairie Village, and Donald F. Cockrell, Kansas City, Kans., assignors to Panhandle Eastern Pipe Line Company, Kansas City, Mo., a corporation of Delaware
Filed Apr. 22, 1963, Ser. No. 274,438
8 Claims. (Cl. 15—104.06)

This invention relates to fluid flow lines and the introduction and removal of pipe line cleaning devices or fluid phase separation devices, and more particularly to a combination valve and cleaning or separation device launcher and catcher for use in such fluid pressure flow lines.

This application is a continuation-in-part of our co-pending United States application for patent, Serial No. 156,847, filed December 4, 1961, and now abandoned, for "Combination Valve and Cleaning Ball Launcher."

In fluid pressure flow lines, such as gas and oil pipe lines, foreign material may accumulate, and some material will be deposited or adhere to the walls of the pipe lines with the result that flow therethrough is restricted. In order to remove such deposits, corrosion, foreign particles and material, it is conventional practice to insert clean-out plugs or resilient balls in the lines and, when flow pressure is applied behind the clean-out devices or balls, it forces the devices or balls forwardly through the line. The clean-out devices or balls have engagement with the walls of the pipe line to remove deposits and force same, together with other foreign material, ahead of the clean-out device as it moves through the line. Also, separation devices may be introduced into flow lines to separate fluid phases. It is also common practice to provide a plurality of valves, bypasses and branch pipes, traps and the like in each end of a section of pipe line to be cleaned for control of the flow of fluid and, also, to introduce and remove the cleaning device from the line. This arrangement requires great expenditure in auxiliary equipment and substantial losses in the field or requires the section to be taken out of service during cleaning. Combination valves and ball launchers heretofore produced are usually used in large flow lines whereby control structures must be large so that power actuators have been used to move the valve members, but the combined size of the valves and actuators in such structures creates difficulties in locating them and, also, problems due to the expense of the structures and difficulties of installation.

The principal objects of the present invention are to provide a device for controlling flow in a pipe line and for introducing a cleaning device or fluid phase separator into said pipe line that will require no special branch line and will eliminate above-mentioned disadvantages; to provide such a device in the form of a full flow valve structure for insertion in a main flow line with a valve member in the form of a piston having a transverse flow line passage and a cleaning device-receiving portion spaced therein wherein the piston is movable in a valve chamber to control the flow and, also, launch a cleaning ball into the line; to provide such a structure wherein fluid pressure is selectively introduced into the piston chamber at either end of the piston to effect movement thereof from ball-receiving position to ball-launching position; to provide such a structure that when in the ball-receiving position the transverse flow passage through the piston is disposed in full flow position; to provide such a structure with a piston having a portion movable to shut off flow through the line; to provide such a structure with a member extending exteriorly of the valve body that is connected to the piston to indicate the position thereof and is also operable to selectively move a piston portion to flow-closing position; and to provide such a structure that is economical to manufacture, efficient in operation, that is compact and that will serve as a flow control valve during the normal operations of the pipe line as a ball launcher and catcher during cleaning operations.

Other objects and advantages of this invention will become apparent from the following description taken in connection with the accompanying drawings wherein are set forth by way of illustration and example certain embodiments of this invention.

FIG. 1 is a diagrammatic elevational view of a fluid flow pipe line with a valve fitting embodying the features of the present invention in said pipe line.

FIG. 2 is a vertical sectional view through the combination valve and cleaning ball launcher in full line flow position.

FIG. 3 is a vertical sectional view through the combination valve and cleaning ball launcher with the valve member in ball-launching position.

FIG. 4 is a vertical sectional view through the combination valve and ball launcher with the valve members in flow-closing position.

FIG. 5 is a horizontal sectional view through the valve taken on the line 5—5, FIG. 3.

FIG. 6 is a sectional view through the valve structure taken on the line 6—6, FIG. 4.

Referring more in detail to the drawings:

The reference numeral 1 generally designates a fluid pressure flow line having a valve fitting and cleaning device launcher 2 at the upstream end of a pipe line section 3. The pipe line section 3 may be of any desired length between control points as, for example, eight miles in length, and a valve fitting and cleaning-device catcher will preferably be positioned at the downstream end of said section with the structure of said downstream fitting being substantially the same as the fitting 2, as later described.

The valve fitting 2 preferably is of a full flow type having an inlet end or branch 4 adapted to be connected to an adjacent end of a pipe section upstream therefrom as by a flange connection 5. The outlet end or branch 6 is adapted to be connected to the upstream end of the section 3 as by a flange connection 7. The valve fitting 2 preferably includes a body or housing 8 having an elongated chamber 9 therein with one end closed by an upper head 10 and the other end closed by a lower head 11. The chamber 9 is preferably cylindrical in shape and slidably received therein is an elongate piston 12, said piston being free and adapted to move from one end of the chamber 9 to the other. In the illustrated structure, the upper and lower heads 10 and 11 are suitably secured to the ends of the body or housing 8 in fluid-tight relation as by fastening devices such as screws 13 extending through bores 14 in the heads and screwed into threaded sockets 15 in the ends 17 and 18 of said body. Each of the heads 10 and 11 have reduced portions 19 extending into the chamber ends with seal rings 20 positioned in grooves 21 of said head portions 19 to form the seals. The head portions 19 also provided stops to limit movement of the piston 12.

The piston 12 has a transverse full flow passage 22 extending therethrough and the inlet and outlet flow connections 4 and 6 of the body are disposed whereby when the piston is at one end of the chamber 9, as for example toward the head 10, the transverse passage 22 aligns with an inlet passage 23 and outlet passage 24 which are all preferably of the same size as the bore through the pipe section 3. The piston 12 and body 8 have cooperatively engaged portions whereby the movement is unidirectional, that is, the cooperatively engaged portions prevent relative rotation but permit movement of the piston 12 longitudinally of the chamber 9. In the illustrated structure, the housing 8 has inwardly extending opposed ribs 25 and the piston has corresponding grooves 26 that serve as cooperative guides that retain the piston and chamber in the same orientation as to the flow passage as the piston is moved in the chamber. In order to prevent leakage by the piston, suitable seals are arranged relative the flow passages. In the illustrated structure, there are seal members 27 positioned in grooves 28 in the housing surrounding the inlet and outlet passages 23 and 24 and in sealing engagement with the piston surface which piston surfaces engage the surface 29 defining the chamber 9.

The housing or body 8 has a lateral bore 30 extending therefrom communicating with a cleaning device holder 31 which, in a launcher structure, preferably has the bore 30 spaced above the outlet connection 6, and in a catcher structure the device would be turned around whereby the holder would be above the inlet connection 4. The bore 30 is spaced longitudinally of the body from the passage 24 and the cleaning device holder 31 consists of an outwardly extending tube or portion preferably inclined upwardly with a through bore 31' of suitable size to receive cleaning devices such as resilient balls 32. The free or open end 33 of the holder is normally closed by a cover 34 which is removably mounted thereon. In the illustrated structure, the cover member 34 is swingably mounted by hinge means 35 and is secured in closed position by a suitable fastening device such as a bolt 36 pivoted on the holder 31 and a nut 37 threaded on said bolt in engagement with said cover member. A gasket member 38 is interposed between the cover 34 and the end 33 of the holder to provide a fluid-tight seal therefor. The cover 34 is preferably provided with a suitable valve 39 that is selectively operable to vent pressure from the bore 31' of the holder prior to removing the cover 34 therefrom.

When the valve member or piston 12 is in position for full flow through the structure, as illustrated in FIG. 2, a transverse cleaning device-receiving port 40 registers with the bore 30 in the body, said port being spaced from the flow passage 22 in the piston structure, as illustrated in FIG. 2. When the piston structure is disposed whereby the port 40 is in position to receive a ball from the holder 31, as illustrated in FIG. 2, there is a transverse bore 41 extending through the piston structure with a counterbore 42 adjacent the lateral bore 30, the counterbore 42 and bore 41 defining a shoulder 43 spaced inwardly from the exterior of the piston a suitable distance whereby, when a cleaning device 32 engages said shoulder 43, the cleaning device outer extremities will be within the counterbore and, upon movement of the piston structure, the cleaning device will not be scraped against the side surfaces 29 of the chamber.

The cleaning device, as a resilient ball 32, is preferably slightly larger than the passage 24 which corresponds to the bore of the pipe section 3 whereby the ball will be slightly compressed as it passes through the line. Therefore, to facilitate entry of the ball structure into the piston structure, the bore 41 is preferably substantially the same size as the passage 24, and the counterbore 42 is slightly larger whereby the balls can freely enter into the cleaning device-receiving port 40 in the piston structure. When it is desired to launch a cleaning device into the flow line, with the ball in the port in the piston, it is necessary to move the piston to align the port with the outlet passage 24. It is preferred, due to the sizes of such equipment, to move the piston by power by selectively applying fluid pressure to ends of the chamber 9. In the illustrated structure, a valve 44 is connected to a pressure supply system (not shown) as by a line 45, with a return line 46. The valve is also connected by a line 47 to the upper head 10 which has communication through a passage 48 to the upper end of the chamber 9. The valve 44 has communication through a line 49 connected with the lower head 11 and having communication through a passage 50 to the lower end of the chamber 9. It is preferred that the center portion at the ends of the pistons be recessed as at 51 to facilitate entry of fluid pressure from the ports or passages 48 and 50 to the ends of the chamber. The valve 44 preferably is a conventional four-way type whereby, when it is operated to provide communication for application of fluid pressure from the line 45 through the line 47 to the upper end of the chamber, the line 49 communicates with the return line 46 for escape of fluid pressure from the lower part of the chamber and the application of the pressure to the upper end of the chamber 9 will force the piston 12 downwardly therein to the lower end of its movement wherein the port 40 will register with the passage 24 and flow of fluid in the line 1 from upstream of the valve will flow through the bore 41 and force the ball therewith through the pipe section 3. The housing has seal members 27' positioned in grooves 28' surrounding the bore 30 and engaging the piston to prevent leakage thereby into the holder. After launching of the ball, the valve member or piston may be returned to its full flow position by actuating the valve 44 to provide communication between the lines 47 and 46 for escape of pressure from the upper end of the chamber 9 and providing communication from the pressure line 45 to the line 49 whereby pressure is applied to the lower end of the chamber to force the piston to the other end of he chamber or back to the position, as illustrated in FIG. 2.

It is preferred that the structure have an indicator whereby visual determination of the location of the piston is evident and, also, to provide for manual operation of the piston in the event of failure of the fluid pressure source connected to the line 45. It is also preferred that the structure be such that flow through the valve may be selectively shut off or closed when desired. In the structure illustrated, the piston 12 has an internal bore or socket 52 extending from its upper end 53 and terminating as at 54 between the port 40 and the passage 22. There is a plug 55 movable in the bore 52 to selectively open and close the passage formed by the bores 41 and 42. In the illustrated structure, the bore 52 is generally cylindrical, and the rotatable plug 55 is rotatable therein and has portions of the bores 41 and 42 therein which register with openings 56 and 57 respectively in the wall of the piston defining the bore 52 in one position of the plug, the piston 12 being held against rotation by the ribs 25 in the grooves 26. The piston 12 and plug 55 have cooperating members to limit the rotation of the plug to 90 degrees and, in the illustrated structure, the cooperating portions are an arcuate recess 58 in the lower portion of the plug with sockets 59 engageable by a ball 60 that is biased by a spring 61 into engagement with the sockets in the plug. The spring 61 and ball 60 are carried in a sleeve 62 located in a socket 63 in the piston with the upper end of the sleeve extending into the recess 58 to form a stop to limit the rotation of the plug. When the plug is rotated 90 degrees from the position illustrated in FIG. 2, the portions of the transverse bores 41 and 42 in the plug 55 are moved out of registry with the openings 56 and 57 in the piston wall whereby opposed solid portions 64 of the plug are presented to said openings and form a closure. The upper end of the piston bore 52 is closed by a plate 65 with a seal 66 forming a fluid-tight connection. The plate is secured in the piston by means of suitable fastening devices such as threaded pins 67. The upper end of the plug has a groove or slot 68 engaged by a flattened portion 69 of a stem 70 which extends upwardly from the plug and through a seal member 71 located in an axial bore 72 in the plate 65. A collar 73 is mounted on the stem and engages a shoulder 74 thereof and the bottom of the plate 65 to retain the stem against endwise movement relative to the piston, but permit rotative movement of the stem. The upper portion of the stem is slidably and rotatably mounted in a seal member 75 carried in a bore 76 in the upper head 10 with said stem extending therethrough and having a handle 77 on the upper end thereof for facilitating rotation of the plug 55. With this arrangement of the stem and handle, the position of the handle and the extension of the stem 70 and handle from the body 8 provides a visual indication as to the location of the piston 12 in the chamber 9. Also, the position of the handle 77 is preferably parallel to the portion of the transverse bores in the plug whereby the position of the handle indicates the location of said bores or the position of the plug in the piston. When it is desired to shut off flow through the structure, the handle 77 is rotated to rotate the plug to the position illustrated in FIG. 4, and then the valve 44 is operated to apply fluid pressure to the upper end of the chamber 9 and vent the lower end of the chamber through the line 49 and line 46 to the return whereby the piston is forced downwardly in the chamber 9 into the position illustrated in FIG. 4 whereby the plug 55 forms a shut-off to stop flow through the pipe line. The plug 55 can also be moved to throttle flow through the pipe line, and it is usually desirable to move the piston to the position illustrated in FIG. 2 before rotation of the plug so that the pressure will be balanced on the plug and high pressures will not interfere with ease of rotation thereof.

It is believed that we have provided a power-actuated valve and ball launcher providing selective movements for either full flow through a pipe line, the shutting off of flow through the pipe line, throttling of the flow, and also for launching or catching cleaning devices or fluid-separation devices adapted to move with fluid through the pipe line, all in a structure that is compact with a minimum of length for such a power-actuated structure.

It is to be understood that while we have illustrated and described one form of our invention, it is not to be limited to the specific form or arrangement of parts therein described and shown except insofar as such limitations are included in the claims.

What we claim and desire to secure by Letters Patent is:
1. A device for controlling flow in a pipe line for introducing a cleaning device into said pipe line comprising,
   (a) an elongate body having an elongate piston chamber therein,
   (b) a piston unidirectionally reciprocable in said chamber and formed with a transverse cleaning device-receiving port and a transverse flow passage spaced longitudinally of the piston from said port,
   (c) means in said body adapted to receive a cleaning device and dispose same in said cleaning device-receiving port in the piston when said piston is moved toward one end of the chamber,
   (d) said body having aligned inlet and outlet flow passages intersecting said chamber,
   (e) said inlet and outlet passages being disposed for alignment with the cleaning device-receiving port in the piston when the piston is moved toward the other end of the chamber, and
   (f) means selectively operable to move the piston toward the chamber ends,
   (g) said piston having means movable therein to selectively permit and stop flow through said pipe line.
2. A device for controlling flow in a pipe line and for introducing a cleaning device into said pipe line comprising,
   (a) an elongate body having an elongate piston chamber therein,
   (b) a piston unidirectionally reciprocable in said chamber and formed with a transverse cleaning device-receiving port and a transverse flow passage spaced longitudinally of the piston from said port,
   (c) means in said body adapted to receive a cleaning device and dispose same in said cleaning device-receiving port in the piston when said piston is moved toward one end of the chamber,
   (d) said body having aligned inlet and outlet flow passages intersecting said chamber,
   (e) said inlet and outlet passages being disposed for alignment with the cleaning device-receiving port in the piston when the piston is moved toward the other end of the chamber.
   (f) means selectively operable to move the piston toward the chamber ends,
   (g) said piston having means movable therein to selectively permit and stop flow through said pipe line, and
   (h) means connected with said piston and extending outwardly from the body to form a visual indicator as to the position of the piston in the chamber.
3. A device for controlling flow in a pipe line and for introducing a cleaning device into said pipe line comprising,
   (a) an elongate body having an elongate piston chamber therein,
   (b) a free piston reciprocable longitudinally of said chamber and formed with a transverse cleaning device-receiving port and a transverse flow passage spaced longitudinally of the piston from said port,
   (c) guide means in said body retaining the piston against rotation relative to said body,
   (d) said body having a lateral bore with a detachable closure and adapted to receive a cleaning device and disposed for alignment with said cleaning device-receiving port in the piston when said piston is moved toward one end of the chamber,
   (e) said body having aligned inlet and outlet flow passages intersecting said chamber and spaced from said lateral bore whereby they align with said transvese flow passage in the piston when the piston is toward said one end of the chamber for full flow through a pipe line connected with the inlet and outlet passages,
   (f) said inlet and outlet passages being disposed for alignment with the cleaning device-receiving port in the piston when the piston is moved toward the other end of the chamber, and
   (g) means communicating with the ends of the chamber and selectively operable to apply pressure therein to move the piston toward the chamber ends,
   (h) said piston having means movable therein to selectively permit and stop flow through said pipe line.
4. A device for controlling flow in a pipe line and for introducing a cleaning device into said pipe line comprising,
   (a) an elongate body having an elongate piston chamber therein,
   (b) a free piston reciprocable longitudinally of said chamber and formed with a transverse cleaning device-receiving port and a transverse flow passage spaced longitudinally of the piston from said port,
   (c) guide means in said body retaining the piston against rotation relative to said body,
   (d) said body having a lateral bore with a detachable closure and adapted to receive a cleaning device and disposed for alignment with said cleaning device-receiving port in the piston when said piston is moved toward one end of the chamber,
   (e) said body having aligned inlet and outlet flow passages intersecting said chamber and spaced from said lateral bore whereby they align with said transverse flow passage in the piston when the piston is toward said one end of the chamber for full flow through a pipe line connected with the inlet and outlet passages,
   (f) said inlet and outlet passages being disposed for alignment with the cleaning device-receiving port in the piston when the piston is moved toward the other end of the chamber,
   (g) means communicating with the ends of the chamber and selectively operable to apply pressure therein to move the piston toward the chamber ends,
   (h) said piston having means movable therein to selectively permit and stop flow through said pipe line,

(i) and means connected with said piston and extending outwardly from the body to form a visual indicator as to the position of the piston in the chamber.

5. An apparatus of the character described comprising,
(a) an elongate body having an elongate piston chamber therein and oppositely disposed aligned inlet and outlet flow passages intersecting said piston chamber and adapted for communicating connection in a flow line,
(b) a free piston reciprocable longitudinally of said piston chamber and formed with a transverse flow passage disposed for alignment with the inlet and outlet passages in the body when the piston is moved toward one end of the chamber, said piston having a second transverse passage spaced longitudinally of the piston from the first-named transverse flow passage and disposed for alignment with the inlet and outlet passages in the body when the piston is moved toward the other end of the chamber,
(c) means in said body engaging said piston to prevent relative rotation thereof,
(d) a bore extending axially into said piston from the end thereof remote from the flow passage in said piston, said bore intersecting said second transverse flow passage in the piston and terminating in spaced relation to said first-named transverse flow passage in the piston, and
(e) a plug rotatable in the axial bore in the piston and having a transverse bore alignable in one position of the plug with the second transverse bore of the piston whereby when the piston is moved to align said second transverse bore with the inlet and outlet passages flow is permitted through the pipe line,
(f) said plug being rotatable to move the transverse bore therein away from the inlet and outlet passages whereby the plug closes flow through the pipe line.

6. An apparatus of the character described comprising,
(a) an elongate body having an elongate piston chamber therein and oppositely disposed aligned inlet and outlet flow passages intersecting said piston chamber and adapted for communicating connection in a flow line,
(b) a free piston reciprocable longitudinally of said piston chamber and formed with a transverse flow passage disposed for alignment with the inlet and outlet passages in the body when the piston is moved toward one end of the chamber,
(c) means in said body engaging said piston to prevent relative rotation thereof,
(d) said piston having a transverse cleaning device-receiving port spaced longitudinally of the piston from said transverse flow passage,
(e) said body having a lateral bore with a detachable closure and adapted to contain a cleaning device and disposed for alignment with said cleaning device-receiving port in the piston when said piston is moved toward said one end of the chamber,
(f) said inlet and outlet passages being disposed for alignment with the cleaning device-receiving port in the piston when the piston is moved toward the other end of the chamber,
(g) a bore extending axially into said piston from the end thereof remote from the flow passage in said piston, said bore terminating in spaced relation to said transverse flow passage in the piston,
(h) a plug rotatable in the axial bore in the piston and having a transverse bore alignable in one position of the plug with the cleaning device-receiving port whereby when the piston is moved to align said port with the inlet and outlet passages flow is permitted through the pipe line,
(i) said plug being rotatable to move the transverse bore therein away from the inlet and outlet passages whereby the plug closes flow through the pipe line.

7. An apparatus of the character described comprising,
(a) an elongate body having an elongate piston chamber therein and oppositely disposed aligned inlet and outlet flow passages intersecting said piston chamber and adapted for communicating connection in a flow line,
(b) a free piston reciprocable longitudinally of said piston chamber and formed with a transverse flow passage disposed for alignment with the inlet and outlet passages in the body when the piston is moved toward one end of the chamber,
(c) means in said body engaging said piston to prevent relative rotation thereof,
(d) said piston having a transverse cleaning device-receiving port spaced longitudinally of the piston from said transverse flow passage,
(e) said body having a lateral bore with a detachable closure and adapted to contain a cleaning device and disposed for alignment with said cleaning device-receiving port in the piston when said piston is moved toward said one end of the chamber,
(f) said cleaning device-receiving port in the piston being disposed for alignment with said inlet and outlet passages when the piston is moved toward the other end of the chamber,
(g) a bore extending axially into said piston from the end thereof remote from the flow passage in said piston, said bore terminating in spaced relation to said transverse flow passage in the piston,
(h) a plug rotatable in the axial bore in the piston and having a transverse bore alignable in one position of the plug with the cleaning device-receiving port whereby when the piston is moved to align said port with the inlet and outlet passage flow is permitted through the pipe line,
(i) said plug being rotatable to move the transverse bore therein away from the inlet and outlet passages whereby the plug closes flow through the pipe line, and
(j) means connected with the plug and extending outwardly of the body for rotating said plug and also forming a visual indicator as to location of the piston in the piston chamber.

8. An apparatus of the character described comprising,
(a) an elongate body having an elongate piston chamber therein and oppositely disposed aligned inlet and outlet flow passages intersecting said piston chamber and adapted for communicating connection in a flow line,
(b) a free piston reciprocable longitudinally of said piston chamber and formed with a transverse flow passage disposed for alignment with the inlet and outlet passages in the body when the piston is moved toward one end of the chamber,
(c) guide means in said body engaging said piston to prevent relative rotation thereof,
(d) said piston having a transverse cleaning device-receiving port spaced longitudinally of the piston from said transverse flow passage,
(e) said body having a lateral bore with a detachable closure and adapted to contain a cleaning device and disposed for alignment with said cleaning device-receiving port in the piston when said piston is moved toward said one end of the chamber,
(f) said cleaning device-receiving port in the piston being disposed for alignment with said inlet and outlet passages when the piston is moved toward the other end of the chamber,
(g) a bore extending axially into said piston from the end thereof remote from the flow passage in said piston, said bore terminating in spaced relation to said transverse flow passage in the piston,
(h) a plug rotatable in the axial bore in the piston and having a transverse bore alignable in one position of the plug with the cleaning device-receiving port whereby when the piston is moved to align said port with the inlet and outlet passage flow is permitted through the pipe line, (i) said plug being rotatable to move the transverse bore therein away from the inlet and outlet passages whereby the plug closes flow through the pipe line, (j) means connected with the plug and extending outwardly of the body for rotating said plug and also forming a visual indicator as to location of the piston in the piston chamber, (k) cooperative means in the piston and plug to limit rotative movement of the plug, and (l) fluid pressure means communicating with the ends of the chamber and selectively operable to apply pressure therein to move the piston toward the chamber ends.

References Cited in the file of this patent

UNITED STATES PATENTS

| | | |
|---|---|---|
| 2,755,742 | Vincent | July 24, 1956 |
| 2,769,456 | Atkinson | Nov. 6, 1956 |
| 2,790,500 | Jones | Apr. 30, 1957 |
| 3,000,028 | Buie et al. | Sept. 19, 1961 |
| 3,063,079 | Bergman et al. | Nov. 13, 1962 |
| 3,063,080 | Bergman et al. | Nov. 13, 1962 |

FOREIGN PATENTS

| | | |
|---|---|---|
| 309,344 | Great Britain | Sept. 11, 1929 |